United States Patent
Miyata et al.

(10) Patent No.: US 6,895,572 B2
(45) Date of Patent: May 17, 2005

(54) SENSORS

(75) Inventors: Yoshiaki Miyata, Kyoto (JP); Masanori Kadowaki, Kyoto (JP)

(73) Assignee: Omron Corporation, Kyoto (JP)

( * ) Notice: Subject to any disclaimer, the term of this patent is extended or adjusted under 35 U.S.C. 154(b) by 457 days.

(21) Appl. No.: 09/966,591

(22) Filed: Sep. 27, 2001

(65) Prior Publication Data

US 2003/0061403 A1 Mar. 27, 2003

(51) Int. Cl.$^7$ .............................. G06F 9/44
(52) U.S. Cl. ...................... 717/100
(58) Field of Search ............ 717/100, 166–167, 717/127; 709/200, 217–218

(56) References Cited

U.S. PATENT DOCUMENTS 5,594,903 A  * 1/1997 Bunnell et al. ........... 717/162
5,978,578 A  * 11/1999 Azarya et al. ........... 717/100
6,035,240 A  * 3/2000 Moorehead et al. ........ 709/213
6,115,713 A  * 9/2000 Pascucci et al. ........... 709/201

OTHER PUBLICATIONS

Hopp et al. A high performance, multi–application single card signal processor. IEEE. 1990. pp. 83–89.*

Harpham et al. insite continuous monitoring system—information not data. IEEE. 1996.*

* cited by examiner

*Primary Examiner*—Wei Y. Zhen
(74) *Attorney, Agent, or Firm*—Beyer Weaver & Thomas LLP

(57) ABSTRACT

A sensor system is formed with sensors and a controller which are detachably attached to a network to be connected together. Each sensor stores an interface program for its own and the controller serves to upload these interface programs from the individual sensors and use the uploaded interface programs to access these sensors under optimum conditions.

8 Claims, 14 Drawing Sheets

SENSORS

BACKGROUND OF THE INVENTION

This invention relates to sensors, as well as controllers and sensor systems including such sensors and controllers.

For effecting controls of different kinds, say, in an FA system, it has been known to connect sensors to a PLC, to transmit control commands to a target apparatus intended to be controlled by the PLC and to thereby effect controls such as coordination and synchronization. More recently, sensors with signal processing functions are being developed. Such a sensor is connected downstream to a controller through a device net and this controller is connected to the target apparatus through a network such as Ethernet such that control commands are given to the target apparatus through the network on the basis of information from the sensor.

When an application program of a controller thus structured accesses sensor data or a set parameter, it is necessary for the application program to recognize the physical address (such as the address of a data port) of the sensor. A driver for making such an access, however, must be set according to the access model routine, the register model of the sensor and the contents of the functions. As multifunctional sensors are developed, it becomes necessary as a practical matter to provide a driver intrinsic to each sensor. Thus, the common practice has been to provide and incorporate drivers (intrinsic device information) in the application program for each of the sensors connected.

There are countless combinations of sensors and controllers, however, and it is difficult to preliminarily incorporate drivers for all sensors in a controller. When an external device is connected to a personal computer and a driver for this external device is required, on the other hand, it is possible to attach a recording medium such as an FD storing such a driver and install this FD in the personal computer. Since most controllers which are connected to a PLC or a sensor of another kind through a network, are not provided with a driving device for reading from a recording medium, they cannot be directly made use of.

It may also be attempted to connect onto the network a host computer with a driver device capable of reading from a recording medium, to temporarily store the driver intrinsic to the sensor through a recording medium storing the aforementioned driver on the host computer and to download this driver to the controller through the network. It is very cumbersome, however, to go through these steps every time a sensor is replaced. Since the sensor, the controller and the host are often set mutually far apart, furthermore, it makes it even more troublesome to move to each of the localities to carry out these required steps.

SUMMARY OF THE INVENTION

It is therefore an object of this invention in view of the above to provide sensors, controllers and sensor systems such that data which are intrinsic to a sensor for carrying out communications between the sensor and a controller can be set to the controller by connecting the sensor and the controller through a network.

A sensor embodying this invention is disconnectably connectable to a network and is characterized as comprising memory means for storing an interface program for its own use and means for outputting the interface program stored in the memory means to the network.

A controller embodying this invention is disconnectably connectable to a network and is characterized as comprising uploading means for uploading an interface program for a sensor transmitted from the sensor through the network and accessing means for accessing the sensor by executing the uploaded interface program.

A sensor system embodying this invention is characterized as comprising a sensor and a controller as described above and connected together through a network and wherein the controller uploads from the sensor an interface program for that sensor and accesses the sensor by using the acquired interface program.

Interface programs are different for different sensors. According to this invention, each of these different interface programs are stored in corresponding one of these different sensors and the controller obtains these interface programs by its uploading capability. Thereafter, the controller accesses the sensors by using the uploaded interface programs. In other words, the controller is not required to be preliminarily provided with interface programs of many sensors because, when a new sensor system is formed, the interface programs for the sensors which are to be included in the sensor system can be obtained from these sensors, and the controller can thus access these sensors under optimum environmental conditions.

BRIEF DESCRIPTION OF THE DRAWINGS

Throughout herein, like components are indicated by the same numeral even if they are components of different devices and may not necessarily be explained repetitiously.

DETAILED DESCRIPTION OF THE INVENTION

Figure 1:
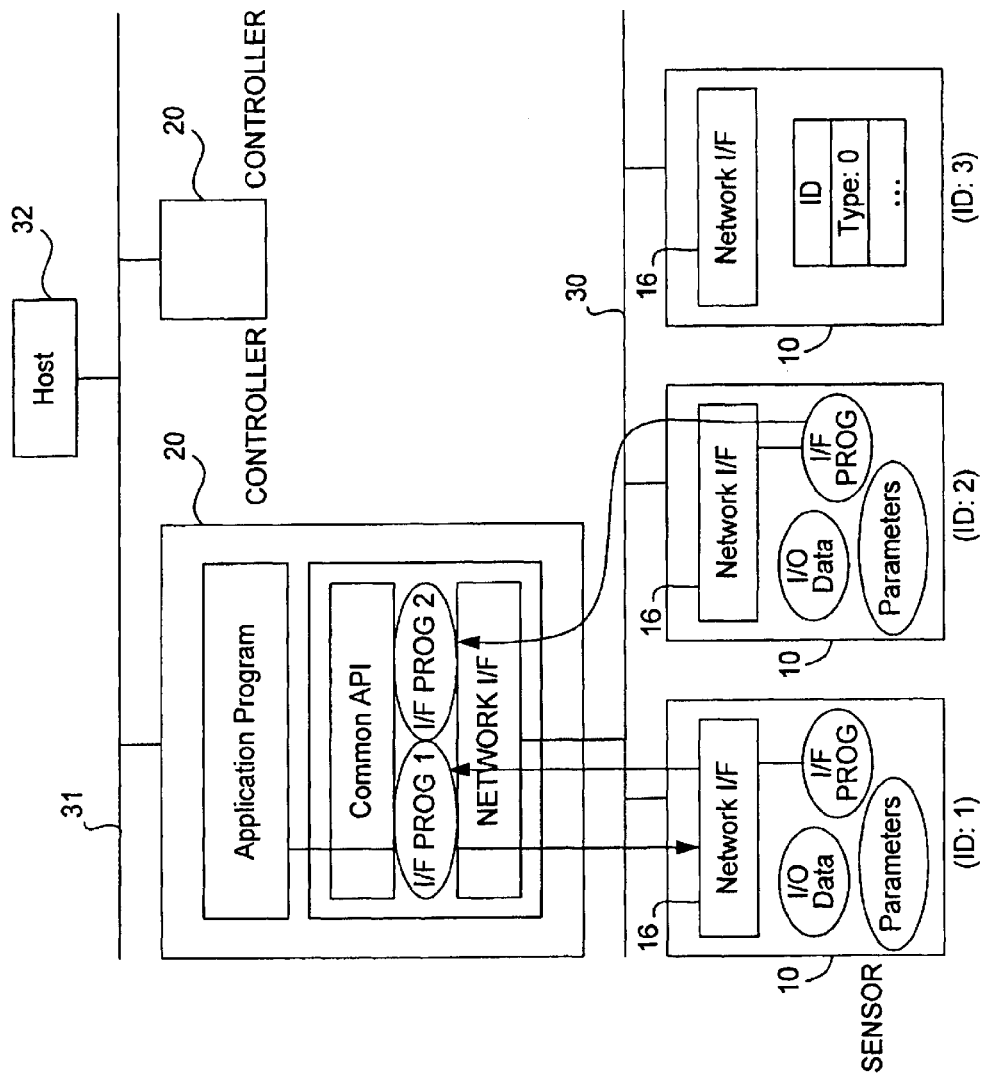
FIG. 1 shows a sensor system according to a first embodiment of the invention.

FIG. 1 shows a sensor system according to a first embodiment of this invention, comprising sensors 10 which are connected to a network 30 and can communicate in both directions and a controller 20 capable of communicating with the sensors 10 through the network (device net) 30. This controller 20 is also connected to another network 31 such as Ethernet so as to be network-connected to other controllers (also indicated by numeral 20), target apparatus (not shown) to be controlled and a host 32.

Explained briefly, each sensor 10 includes a network interface (communication control part) 16 for a general-purpose access by the controller 20 and is provided with a program (interface program) which can execute an intrinsic access routine on the controller 20. Before an actual operation is started with each sensor 10 connected to the controller 20 through the network 30, each sensor 10 receives a request from the controller 20 and uploads to the controller 20 the interface program stored therein. This enables the controller 20 to use these uploaded interface programs to transmit and receive necessary data for carrying out ordinary sensing processes to and from the sensors 10.

Figure 2:
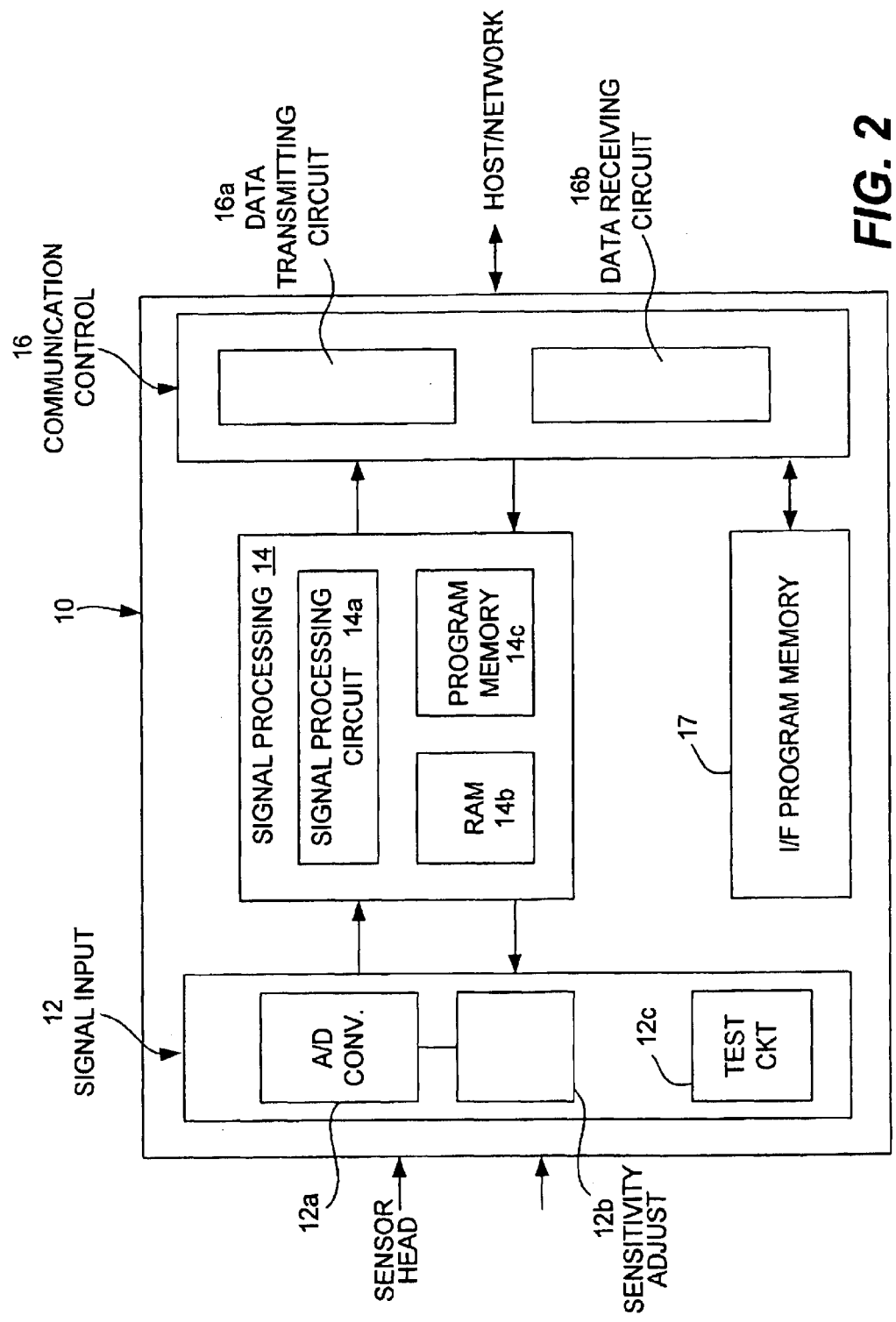
FIG. 2 shows the inner structure of one of the sensors according to the first embodiment of the invention.

As shown in FIG. 2, each of the sensors 10 according to this embodiment is adapted to have a sensor head connected on the downstream side. Raw data (analog signals) received from the sensor head are taken into the sensor 10 and the data obtained by processing them are transmitted through the network 30 to the controller 20. Thus, the sensor 10 includes a signal input part 12 which is for receiving analog signals from the sensor head and is provided with an A/D converter 12a for converting analog signals into digital signals at a sensitivity level set by a sensitivity adjusting part 12b. A test circuit 12c serves to control self-diagnostic functions such as the start of a routine for self-diagnosis and obtaining test results.

Outputted signals from the signal input part 12 (the A/D converter 12a) are received by a signal processing part 14 adapted to carry out a specified signal processing (sensing signal processing) process on the data digitized through the signal input part 12. This is carried out while a signal processing circuit 14a uses a work memory area 14b (RAM) and the program for carrying out this process is stored in a program memory area 14c. The signal processing part 14 may comprise a 16-bit microcomputer, depending on the purpose of use. Different signal processing programs including conventionally known programs may be used, and hence no detailed explanation will be presented.

Data outputted from the signal processing part 14 are transmitted to a data transmission circuit 16a of a communication control part 16 and then through the network 30 to an upper device (controller 20). The communication control part 16 includes a data receiving circuit 16b for receiving data of all sorts transmitted from the controller 20. This communication control part 16 has the functions of a network interface.

The sensor 10 further includes an interface memory area 17 for storing an interface program of its own, that is, an intrinsic program for carrying out on the controller an intrinsic access routine. This interface memory area 17 is connected to the communication control part 16 such that the interface program stored in the memory area 17 can be transmitted to the network 30 and further to the controller 20.

Figure 3:
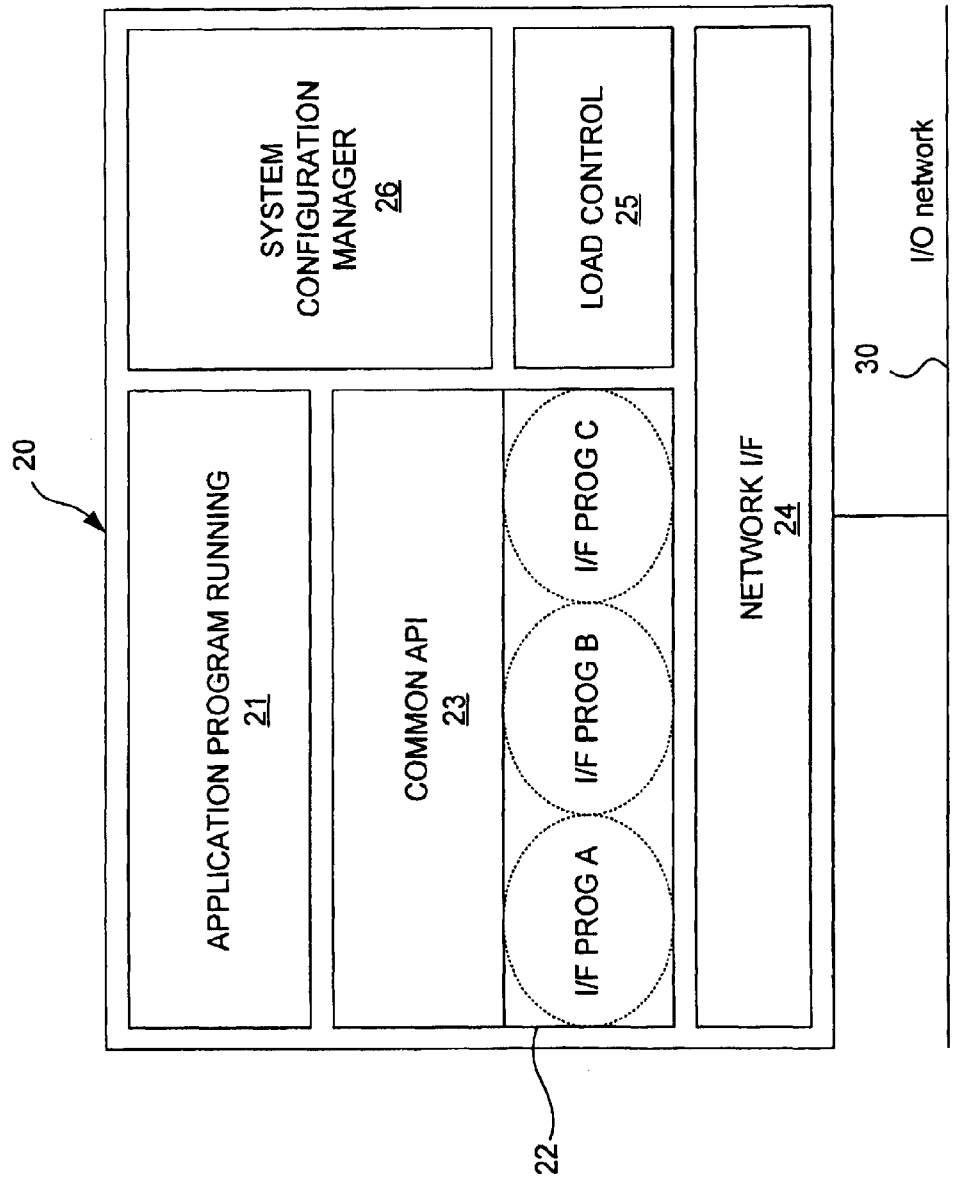
FIG. 3 shows the inner structure of the controller according to the first embodiment of the invention.

The controller 20 is provided with a runtime environment for plotform-independent programs such as Java and includes, as shown in FIG. 3, a network interface (common interface) 24 connected to an application program running part 21 and the network 30, as in conventional examples, for a general-purpose access to transmit and receive data.

The controller 20 also has a memory area 22 for storing physical addresses of sensors which may become necessary when accessing data in these sensors as well as set parameters while the program running part 21 is executing an application program (such as the address of a data port) or interface programs describing the sequence of execution. Interface programs intrinsic to the sensors under its control are stored in this memory area 22.

Between the interface programs stored in the memory area 22 and the application program is a common application interface (common API) 23. Since this common application interface 23 serves to absorb the differences in the handling of the interface programs for the sensors, the interface programs of all these sensors will appear alike when seen therethrough from the side of the application program. In other words, the function of the common application interface 23 is to allow the application program to access the sensors by a common routine. Accordingly, the application program accesses the interface programs of the sensors by using a common application program defined by interface class. Thus, the application program can access all of the sensors 10 through the common application interface 23 without regard to the kinds of the sensors 10. Uploading and downloading of the interface program to and from this memory area 22 are carried out by a load controller 25 under the control of a system configuration manager 26.

Figure 4:
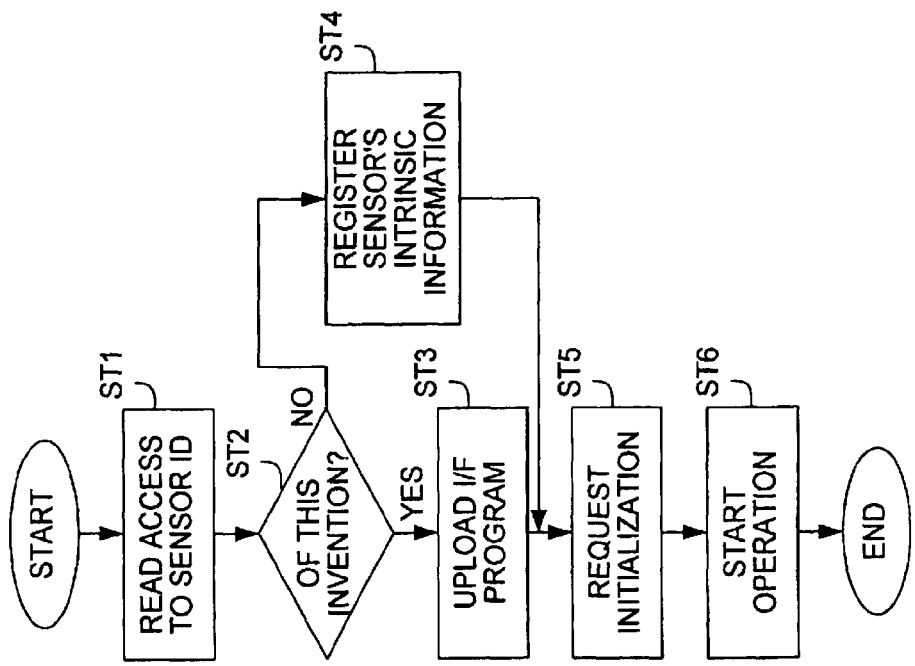
FIG. 4 is a flowchart for explaining the operations of the system configuration manager of the controller according to the first embodiment of the invention.

FIG. 4 is a flowchart showing the functioning of this system configuration manager 26. Initially, a request is made by issuing to a sensor 10 connected to the network a read access to the sensor ID (Step ST1). The sensor which has received this read access responds by communicating its own sensor ID to the controller, and it is determined from this sensor ID whether or not this sensor is one corresponding to this invention, that is, whether or not it is provided with an interface program for itself (Step ST2). If it is determined to correspond to this invention, the load controller 25 is activated and the interface program is uploaded and stored in the memory area 22 (Step ST3).

Next, a request for initialization is issued to the sensor 10 according to the uploaded interface program for that sensor (Step ST5) and, if a signal is received from the sensor to the effect that the initialization has been completed, an operation based on the ordinary routine is started (Step ST6). If it is determined in Step ST2 that the sensor is not one according to this invention, the sensor's intrinsic information is manually registered (Step ST4) and a request for sensor initialization is made thereafter according to the registered data (ST5). Step ST2 is included because there are all sorts of sensors and it cannot be expected that only sensors provided with an interface program according to this invention are connected. Step ST2 makes it possible for the system to operate even if sensors not according to this invention are connected.

Figure 5:
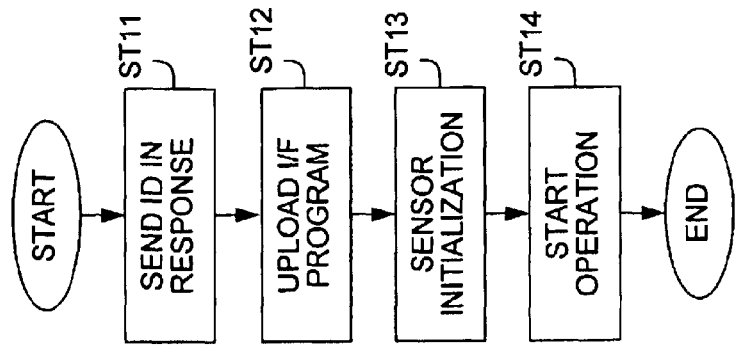
FIG. 5 is a flowchart for explaining the operations of the sensor according to the first embodiment of the invention.

Operations on the side of the sensor 10 are explained next with reference to the flowchart of FIG. 5. When a read access to the sensor ID is received from the controller 20, the sensor 10 responds to it by transmitting its own ID to the controller 20 (Step ST11). It then waits for a request from the controller 20 and uploads the interface program for itself stored in the interface program memory area 17 to the controller 20 through the network 30 (Step ST12). When the uploading has been completed and there is a request for initialization from the controller, this request is complied with and the sensor is initialized (Step ST13), that is, the parameters for configuration data are adjusted and set at optimum values. Explained more in detail, this may include the adjustment of the sensitivity of the A/D converter 12a and signal processing carried out by the signal processing circuit 14a such as the adjustment of tuning parameters including threshold values for judgments, statistical data such as data distribution for satisfactory and defective products and operational data such as input sampling periods and output format. When the sensor initialization has been completed, a signal indicative thereof is transmitted and actual operations (or the execution of signal processing under the initialized condition) are carried out (Step ST14).

With the system thus structured, as soon as the connection between a sensor 10 and the controller 20 is established, the controller 20 can upload from the connected sensor 10 its intrinsic interface program and start up by incorporating it into its own interface block (the memory area 22). Since the controller 20 is thus capable of obtaining the interface programs of target sensors 10 to communicate with, it can have, without regard to the kinds of the sensors 10 to be connected and without requiring any special database, an interface function which is optimum to sensors of all kinds. As for the sensors 10, they each have an interface program suited to itself and can transmit and receive data by using this interface program by uploading it to the controller 20. Thus, they can be accessed from controllers of all kinds through an optimum interface without requiring any special resources or agreements.

Figure 6:
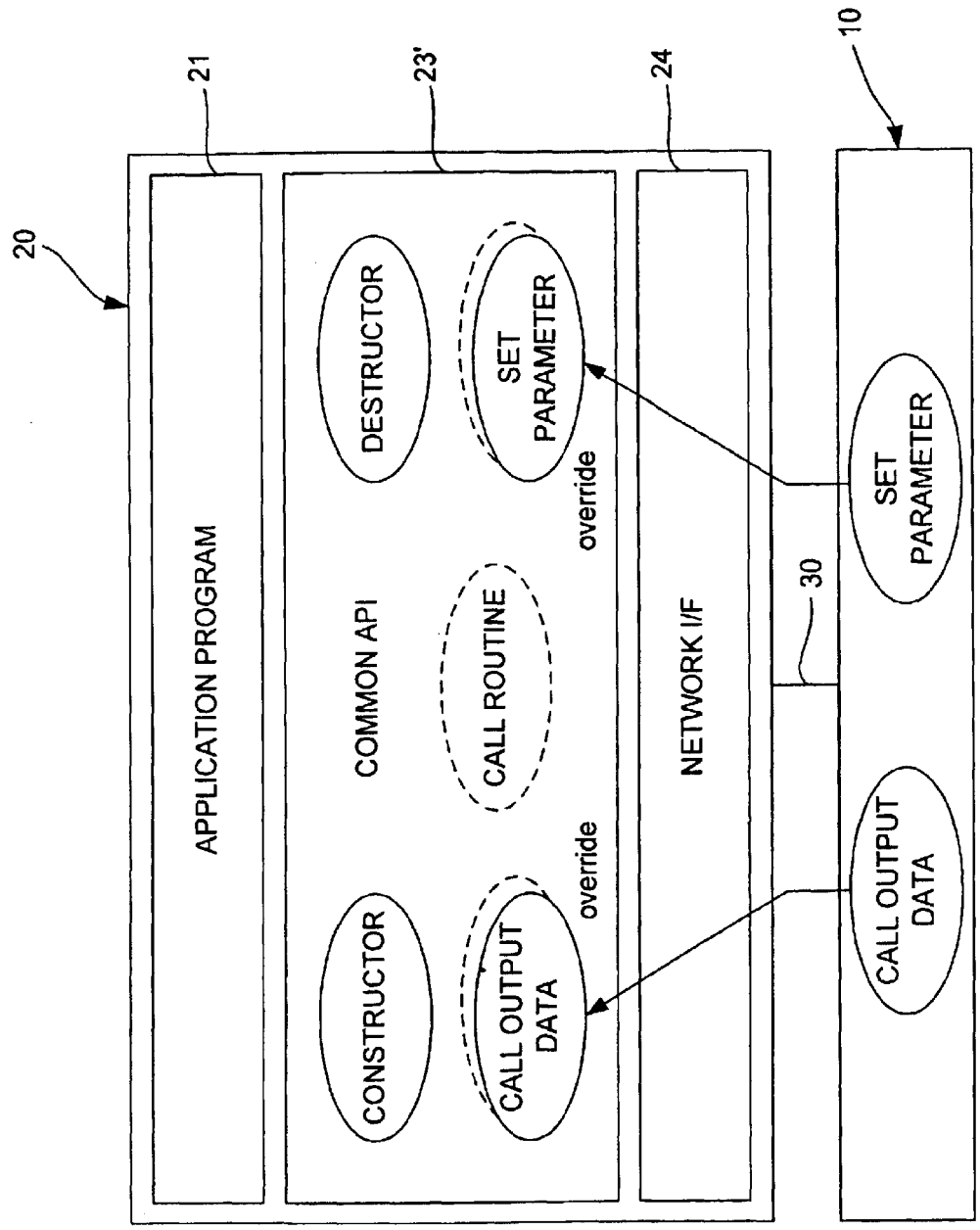
FIG. 6 shows a sensor system according to a second embodiment of the invention.
Figure 7:
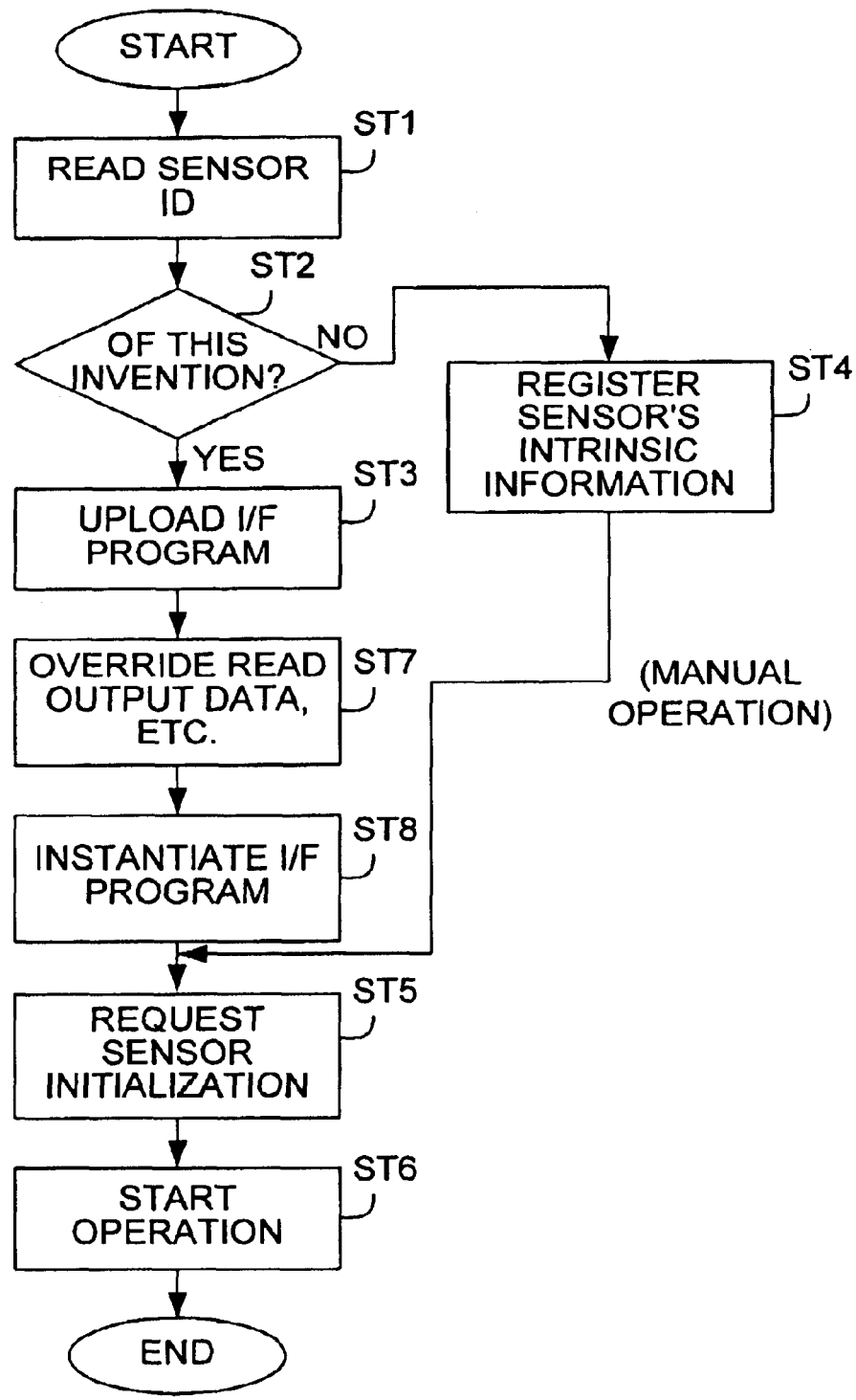
FIG. 7 is a flowchart for explaining the operations of the system configuration manager of the controller in the sensor system of FIG. 6 according to the second embodiment of the invention.
Figure 8:
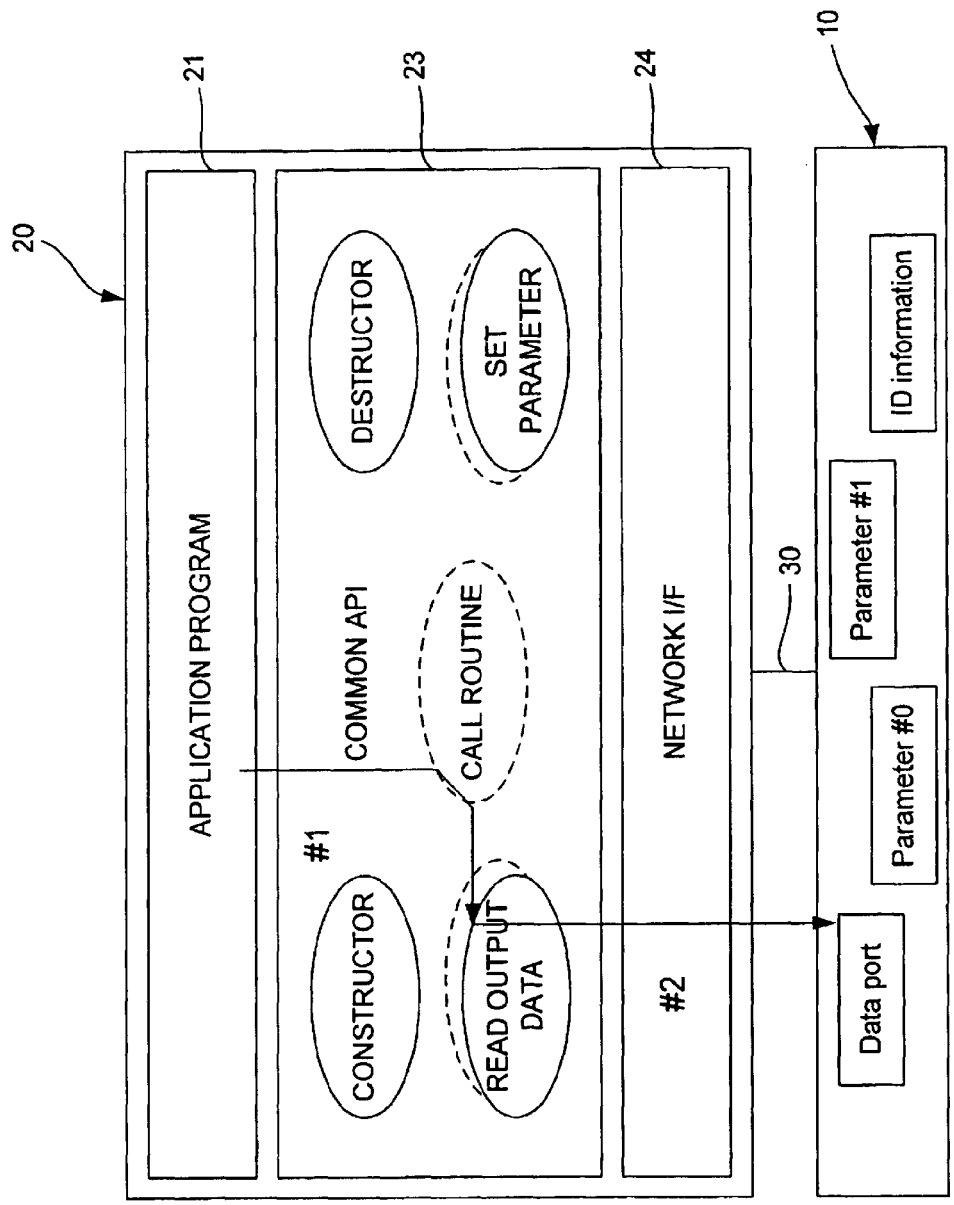
FIG. 8 shows the operation of FIG. 7.

FIGS. 6–8 show a second embodiment of this invention which may be considered a special example of the first embodiment. Numeral 10 again indicates a sensor, and an interface program (driver program) with its intrinsic information such as its register model and access routine is stored in its interface program memory area 17 as a Java program. The interface program thus stored in the sensor 10 is one created as an inherited class of the interface class which defined the common application interface of the controller 20, and the following processing routines (or "Methods") are defined:

Constructor (or "Method #1"): To instantiate as a program and to initialize a sensor;

Destructor (or "Method #2"): To cancel instantiation of a program and to disable the access to a sensor by carrying out a post-treatment on the sensor;

Call General Purpose Routine (or "Method #3"): To specify detailed commands to a sensor and parameters and to receive the results of the process;

Processing intrinsic to sensor: (or Method #4): To store addresses and access routine for carrying out "Read Output Data" (or "Program READ") and "Set Threshold Parameter" (or Program SET") and to carry them out by receiving "Call General Purpose Routine".

As described above, the controller 20 stores as a common application interface a general purpose format as an interface program and forms interface programs intrinsic to the individual sensors by overriding with data uploaded from the sensor 10 ("Read output data" and "Set threshold parameter"). Although not shown in the drawing, the controller 20 is also provided with a system configuration manager 26 and a load controller 25 (as shown in FIG. 3). Operations of the system configuration manager 26 are shown in FIG. 7. As can be understood by comparing it with the flowchart of FIG. 4, the basic functions are alike but the steps are different after the interface program is uploaded from the sensor in Step ST3. In other words, this controller has a runtime environment for Java programs. After the Java class load function is used to upload the interface program of the sensor so as to become under the control of the controller (Step ST3), it overrides "Read output data" and "Set threshold parameter" in corresponding areas (Step ST7). Constructor is then carried out to instantiate the uploaded interface program (Java class) (Step ST8). The steps thereafter are the same as in the first embodiment, initialization of the sensor being requested (Step ST5) and the operation being then started (Step ST6). In this operation, for example, the application may access the instantiated sensor interface program by using the aforementioned common API defined by the interface class (#1 in FIG. 8). When this is received, the overridden process intrinsic to the sensor is called by the mechanism of inheritance of Java and is executed (#2 in FIG. 8).

If FIG. 6 is compared with FIG. 3 which shows the first embodiment of the invention, it will be understood that the interface programs stored in the memory area 22 and the common application program interface 23 shown in FIG. 3 are fused and integrated together to form the common application interface 23' of FIG. 6. If one insists on splitting it into parts, it may be said that "Call general purpose routine" corresponds mainly to the common API 23 of the first embodiment and "Read output data" and "Set threshold parameter" correspond to the individual interface programs.

Another way to interpret may be that the interface program is wholly stored in the controller according to the first embodiment while a kind of template of the interface program is prepared in the controller 20 and an interface program for the sensor is generated by uploading a portion of its position from the sensor and overriding the corresponding position of this template (replacing by a function).

FIGS. 9–12 show a third embodiment of the invention. This embodiment has the first and second embodiments as its basis and is also provided with a local memory function for system configuration data. The controller 20 is optimized with respect to the interface corresponding to the system configuration by uploading the interface program internally stored in the sensor 10. The sensor is configured so as to become operable by initialization setting such as tuning. These are as explained above with reference to the first and second embodiments.

According to this embodiment, the interface programs and the conditions optimized by configuration (configuration data) are stored in the individual memory means such that the system can be set in the optimum condition as stored at the time of rebooting with the same system configuration without carrying out the sensor initialization (such as the tuning). Thus, it becomes easier to speed up the operations, to remove and exchange apparatus and to investigate the causes of an abnormal situation when it occurs.

Figure 9:
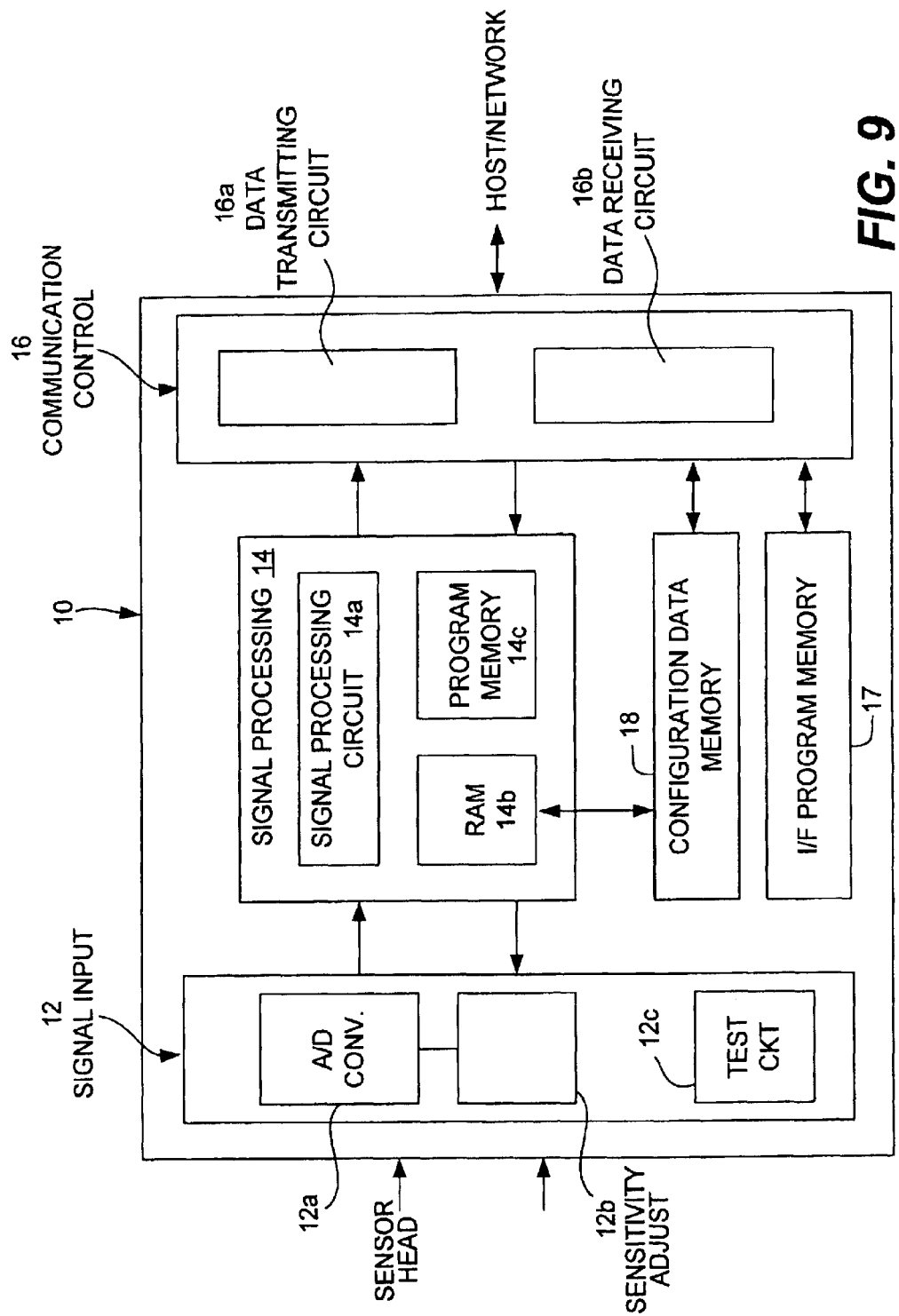
FIG. 9 shows a sensor according to a third embodiment of the invention.

As shown in FIG. 9, the sensor 10 is provided with a configuration data memory area 18. Configuration data which have been optimized by carrying out tuning and parameter adjustment by sensor initialization are set in the parameter variable area inside the work memory area 14b, and the sensor 10 operates thereafter under this optimized condition. The data thus optimized are stored in the configuration data memory area 18. Thus, initialization can be completed at the next start-up time merely by loading the configuration data stored in the memory area 18 in the corresponding parameter variable area unless there has been a change in the system configuration.

Figure 10:
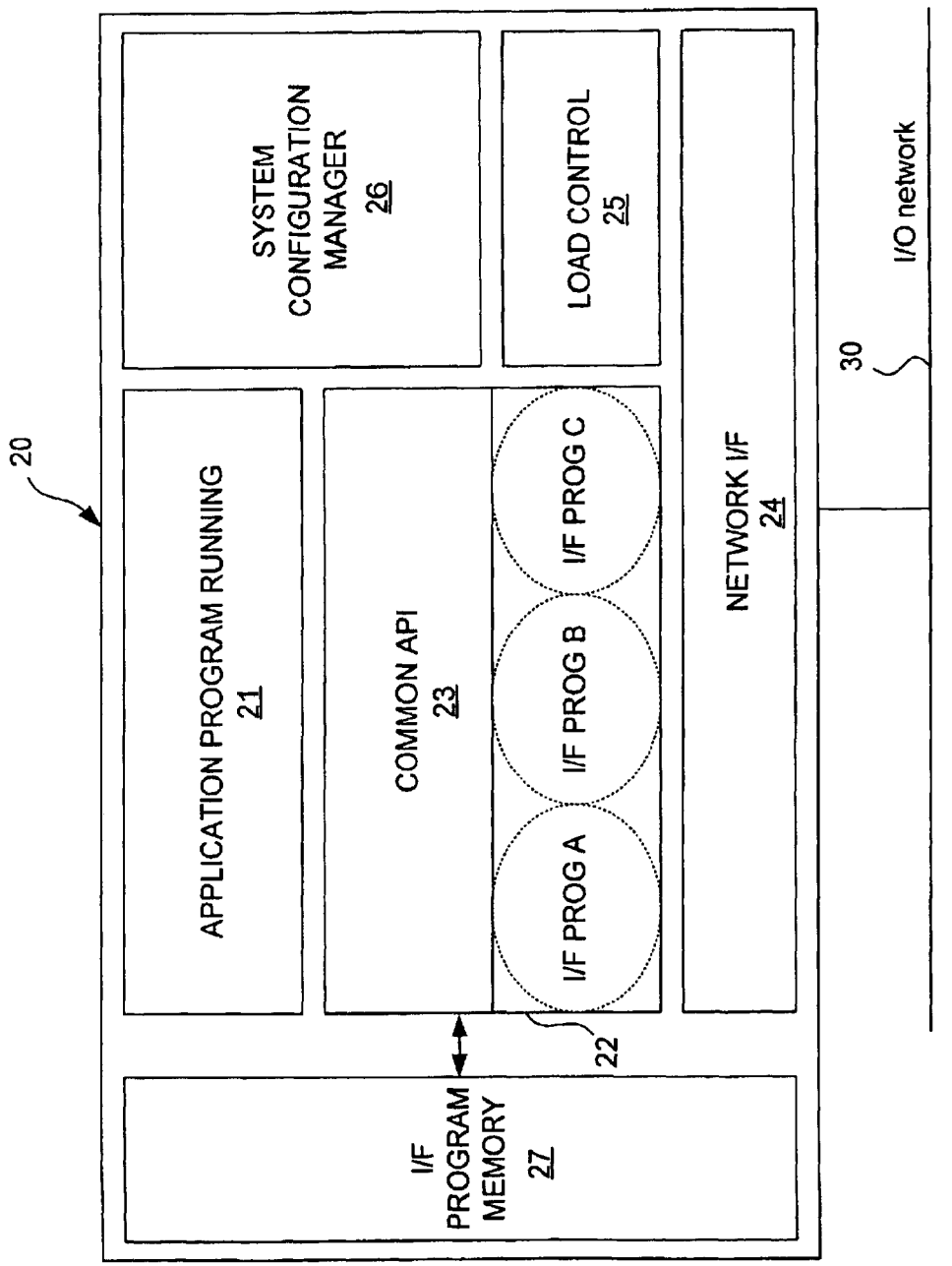
FIG. 10 is a controller used in a system according to the third embodiment of the invention.

As shown in FIG. 10, the controller 20 is provided with an interface program memory area 27 to store the interface program under the optimized condition for the sensor. Thus, the API can be instantiated at the time of a start-up from the beginning by the optimized interface program stored in the interface program memory area 27, not a general purpose common program, unless there has been a change in the system configuration.

Although an example with the interface program memory 27 formed inside the controller 20 has been shown, this is not intended to limit the scope of the invention. It goes without saying that an external memory device may be connected to the controller 20 and the interface program may be stored in such an external memory device. In either case, optimized configuration data may thus be stored in addition to the interface program.

Figure 11:
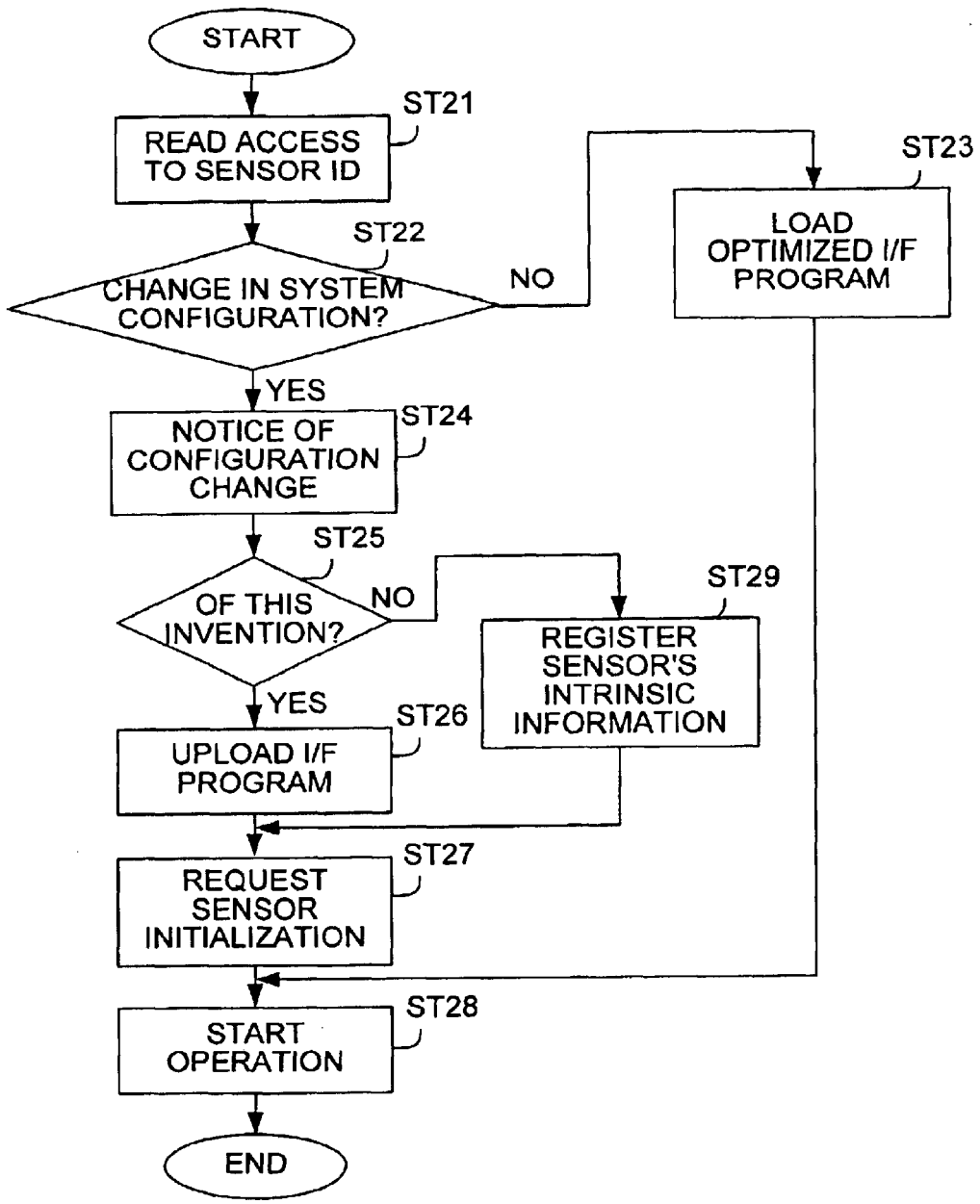
FIG. 11 is a flowchart for explaining the operations of the system configuration manager of the controller according to a fourth embodiment of the invention.

The operations of the system configuration manager of the controller 20 is shown in FIG. 11, it being assumed that an optimized interface program which has been in use is already stored in the interface program memory area 27. First, the ID read access of the sensor is requested and the system waits for a response from the sensor (Step ST21). It is then examined whether there has been a change in the system configuration since the previous time (Step ST22) and if there has not been any change, the already optimized interface program stored in the interface program memory area 27 is loaded in the memory area 22 to instantiate the API by the optimized interface program (Step ST23). Thereafter the program advances to Step ST28 to start the operation.

If it is determined that there has been a change in the system configuration, the program advances from Step ST22 to Step ST24 to issue a notice of configuration change to this sensor and waits for a response. When the receipt acknowledgment is received, it is determined whether the sensor is one according to this invention (ST25), as explained with reference to FIG. 4 above. If it is, a request is made to upload the interface program and it is uploaded (Step ST26). If the sensor is not according to this invention, the sensor's intrinsic information is registered by a manual operation (Step ST29). If the registration of the interface program by either of the means, the sensor initialization is requested (Step ST27) and the operation is started after the completion is signaled from the sensor.

Figure 12:
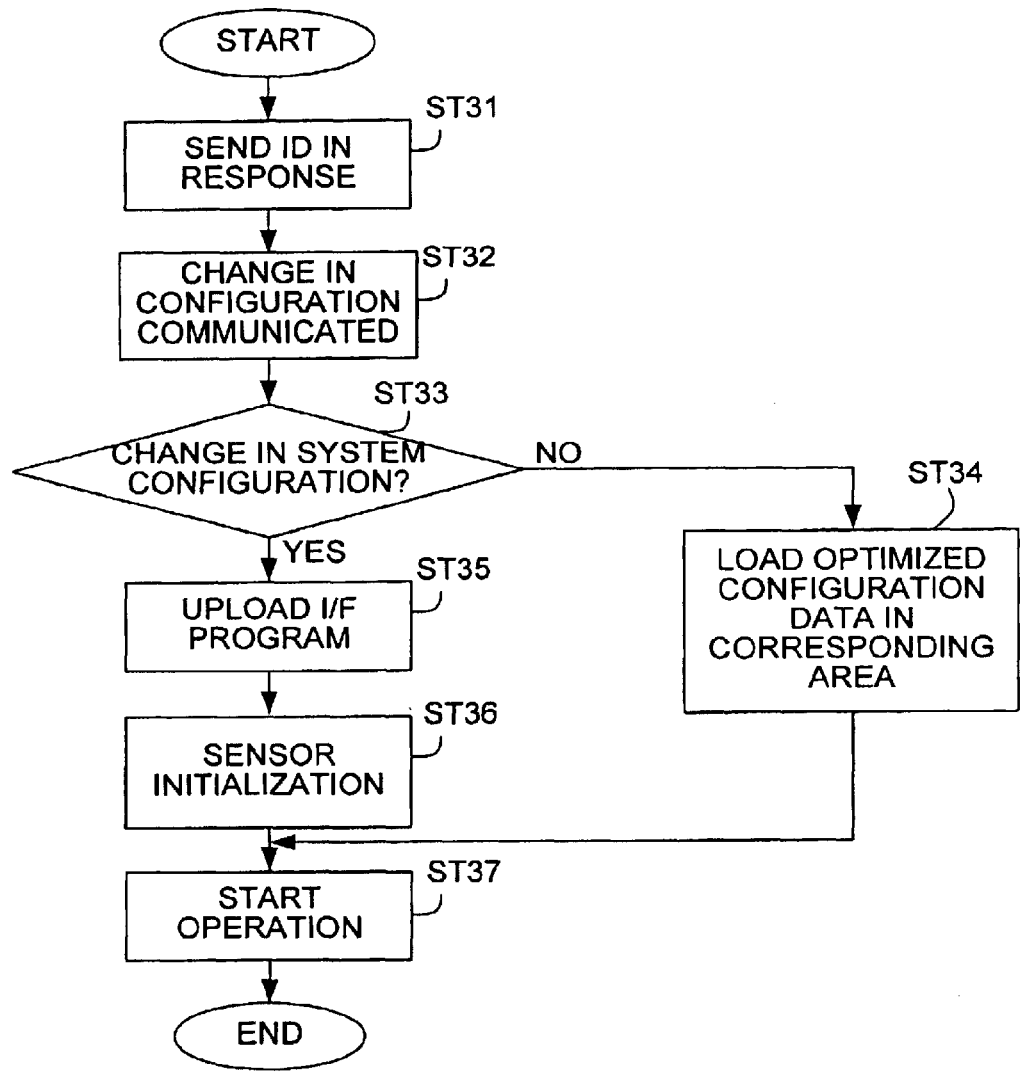
FIG. 12 is a flowchart for explaining the operations of a sensor according to the fourth embodiment of the invention.

As shown in FIG. 12, the sensor transmits its own ID in response to the read access received from the controller 20. An answer back is returned thereafter if a configuration change is communicated from the controller 20 (Step ST32). According to the present example, there is no communication if there is no change in the system configuration, as can be understood from the route from Step ST22 to Step ST24 in FIG. 11. If the sensor waits for a specified length of time after its ID is transmitted but receives no communication from the controller regarding a configuration change, the sensor understands that there was no system configuration change and passes through the Step ST32.

If it is acknowledged in Step ST 33 that there was no change in the system configuration, the configuration data stored in the configuration memory area 18 of the sensor 10 are loaded in a corresponding variable number area (Step ST34) and the operation is started (ST37). If there has been a change in the system configuration, on the other hand, there is a request for an upload from the controller 20 and the interface program stored in the interface program memory area 17 is uploaded in response (Step ST35). If this upload is successful, there is a request for sensor initialization and the sensor initialization such as tuning is carried out in response to the request. When this is completed, a signal to this effect is transmitted (Step ST36) and the operation is started thereafter (Step ST37).

Figure 13:
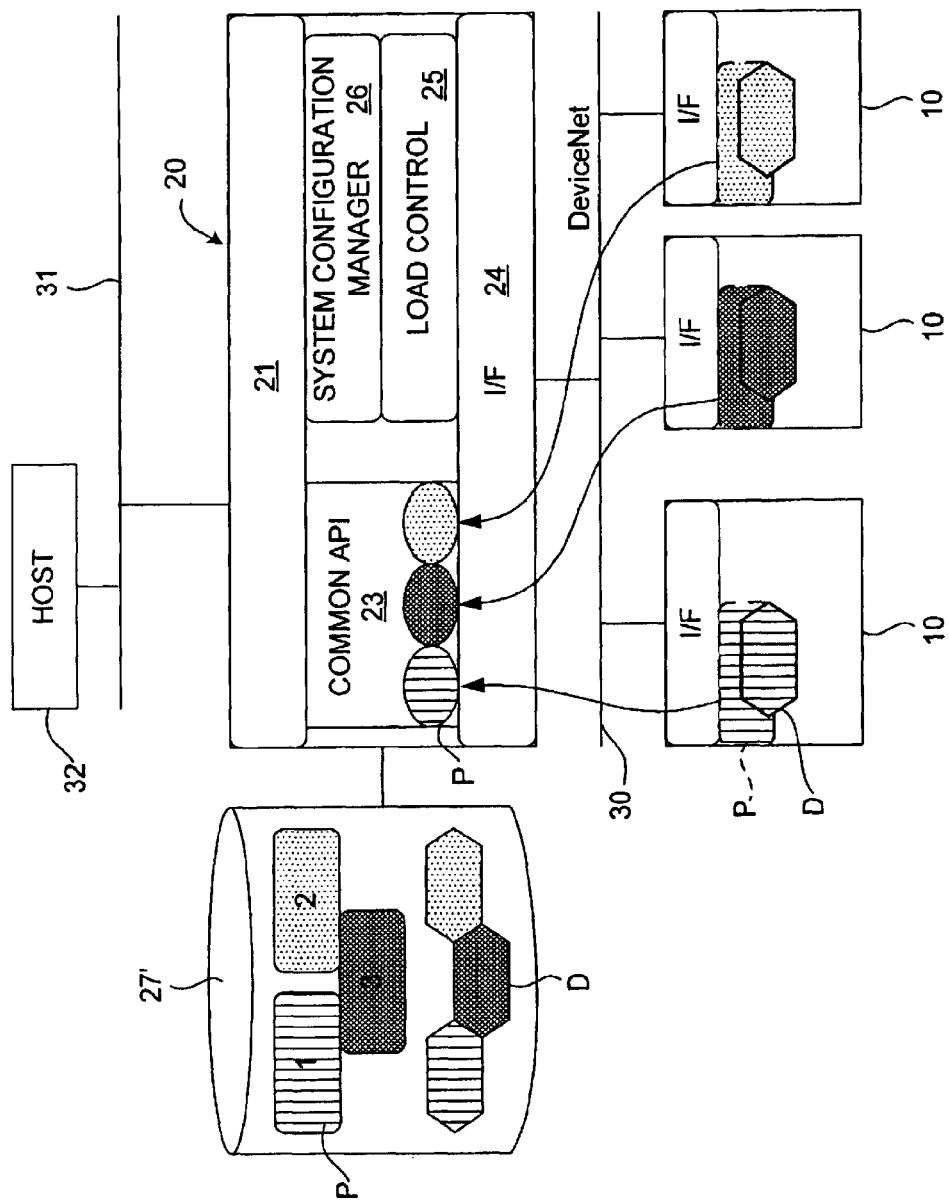
FIG. 13 shows a sensor system according to a fifth embodiment of the invention.
Figure 14:
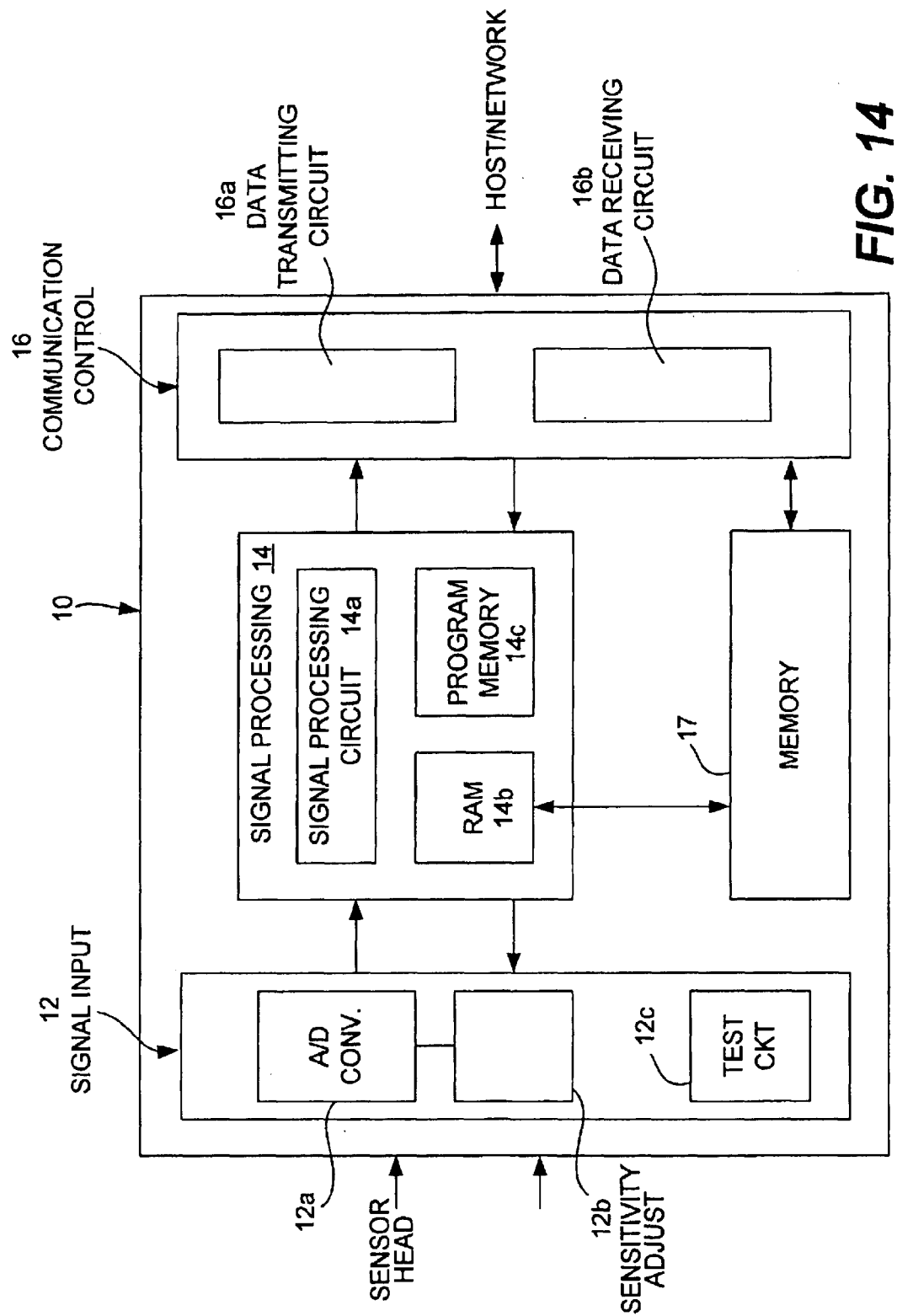
FIG. 14 shows the inner structure of the sensor according to the fifth embodiment of the invention.
Figure 15:
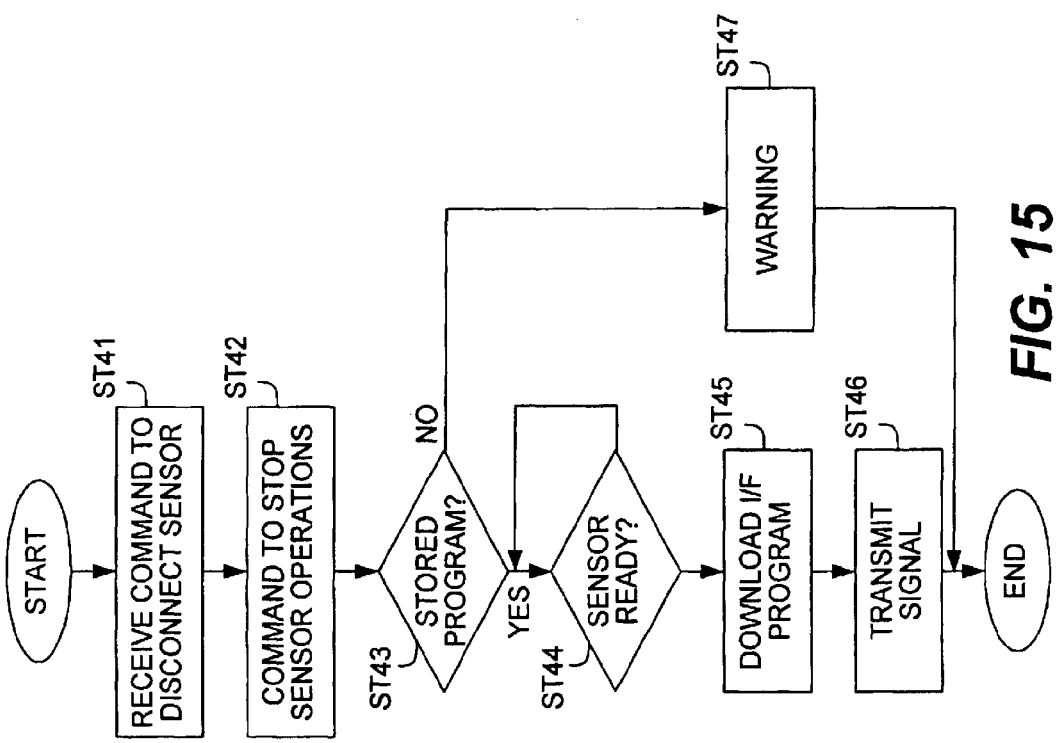
FIG. 15 is a flowchart for explaining the operations of the system configuration manager of the controller according to the fifth embodiment of the invention.

FIGS. 13–15 show a fourth embodiment of this invention intended for reutilization of memory areas of the sensor while the sensor in each of the embodiments described above maintains an interface program memory area 17 and the interface program remains stored in this memory area 17 even after it is uploaded in the controller. It goes without saying, however, that it is desirable to make the sensor as small as possible, and the interface program, once uploaded in the controller 20, is not used unless the system configuration is changed. In other words, the memory capacity of the area for storing the interface program is wasted as a useless capacity.

As shown schematically in FIG. 13, therefore, the system is so configured that when each sensor 10 has uploaded its interface program (P) in the controller 20, the configuration data (D) obtained later by the initialization process are stored in the memory areas where the interface programs were stored. As in the case of the third embodiment, furthermore, the uploaded interface programs are stored in an external memory device 27' which may be connected to the controller 20 either directly or indirectly through a network.

As shown in FIG. 14, the sensor 10 according to the fourth embodiment of the invention is provided not only with the function of freeing the memory area 16' for storing the interface program but also with the function of storing the configuration data in the memory area 16' after it has been freed. In other words, the sensor 10 is capable of using the area for storing the interface program in common for storing the configuration data. In other aspects, the structure of the sensor 10 according to this embodiment is the same as that of the other sensors according to the other embodiments described above.

In this embodiment, too, as explained with reference to the third embodiment of the invention, a memory device may be provided either internally or externally and the externally provided memory device may be used only for the storage of the interface program instead of storing both the interface program and the configuration data.

Thus, unless the system configuration is changed, it is possible to set the system in the stored optimum condition at the time of a start-up without going through the sensor initialization process such as the tuning.

When the sensor is disconnected from the system, the interface program stored in the external memory device 27' on the side of the controller is downloaded preliminarily back to the sensor, thereby returning to the sensor 10 disconnected from the network 30 the interface program for that sensor 10. If this were not done, the sensor 10 would no longer have its interface program.

FIG. 15 shows the operations of the system configuration manager 26 of the controller 20 for carrying out this process. When a command to disconnect a sensor is received (Step ST41), a command signal for stopping operations is transmitted to the corresponding sensor (Step ST42). It is then determined if there is a stored program regarding this sensor (Step ST43) and the program is terminated after transmitting a warning on an abnormal condition if there is none (Step ST47). If there is a stored program (the interface program stored in the external memory device 27'), it is checked whether the sensor is ready (Step ST44). Explained more in detail, since a signal informing that the sensor, upon receiving the command in Step ST42, has stopped its operation is transmitted, it is determined that the sensor is ready by receiving this signal, and the stored interface program is downloaded to the sensor (Step ST45). This series of operations is completed by transmitting a signal indicating that the sensor has been disconnected (Step ST46).

Figure 16:
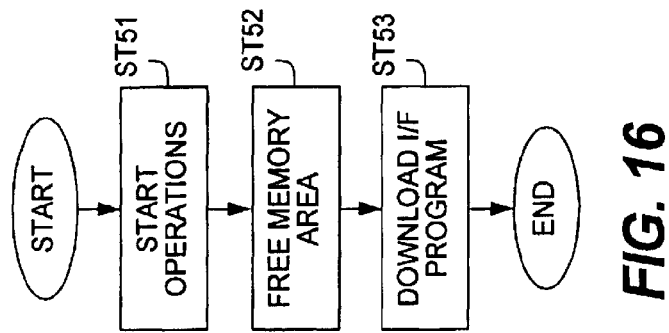
FIG. 16 is a flowchart for explaining the operation of a sensor according to the fifth embodiment of the invention.

FIG. 16 shows the operations on the side of the sensor in the meantime. When the command to stop is received from the controller 20 (Step ST51), its operations are stopped, the memory area 16' is freed (Step ST52), and thereafter a signal is transmitted to the controller 20 to indicate that these operations have been completed. Next, its own interface program is downloaded from the controller and stored in the memory area 16' which has been freed, thereby completing the restoration process. Thus, the internally stored interface program corresponding to the ID data (such as the kind) of the connected sensor can be obtained through an external memory means such as internet or a floppy disk or a communication means.

In summary, this invention is characterized in that the interface program intrinsic to a sensor is stored in the sensor itself such that a controller, when it is connected to the sensor through a network, can access the sensor in an optimum environment by uploading this interface program from the sensor. Since this uploading operation has only to be carried out at the actual time of making the connection, there is no need to preliminarily provide the controller with data on the individual sensors to be connected. This improves the use efficiency of the memory areas, especially when sensors of new versions are introduced. Moreover, the interface programs can be downloaded easily through the network.

What is claimed is:

1. A sensor, which is connectable to a network, said sensor comprising:
    a sensor head;
    a signal processing part that processes signals inputted from said sensor head;
    a communication control part that is used by a controller for communicating with said sensor by a general-purpose access;
    an interface memory area that stores an interface program used by said controller when accessing by an access routine particular to said sensor;
    a load controller that uploads said interface program to said controller in response to a request from said controller; and
    a configuration manager that carries out initialization of said signal processing part according to said interface program in response to an initialization request from said controller.

2. The sensor of claim 1 wherein said configuration manager informs said controller when said initialization is completed and thereafter carries out ordinary sensing processes.

3. The sensor of claim 1 wherein said initialization includes adjustment of parameters including threshold values for judgments.

4. The sensor of claim 2 wherein said initialization includes adjustment of parameters including threshold values for judgments.

5. The sensor of claim 1 wherein said initialization includes adjustment of operational data including input sampling periods and output format.

6. The sensor of claim 2 wherein said initialization includes adjustment of operational data including input sampling periods and output format.

7. The sensor of claim 1 wherein said interface program is created as an inherited class of interface class and defines a plurality of methods, said methods including Constructor for instantiating as a program and initializing said sensor and Call General Purpose Routine for specifying detailed commands to said sensor and parameters and receiving results of processes.

8. The sensor of claim 2 wherein said interface program is created as an inherited class of interface class and defines a plurality of methods, said methods including Constructor for instantiating as a program and initializing said sensor and Call General Purpose Routine for specifying detailed commands to said sensor and parameters and receiving results of processes.

* * * * *